(12) United States Patent
Lambeck

(10) Patent No.: US 12,611,739 B2
(45) Date of Patent: Apr. 28, 2026

(54) ROBOTICS FOR WELDING OF COLUMNS

(71) Applicant: NEW YORK UNIVERSITY, New York, NY (US)

(72) Inventor: Richard Lambeck, New York, NY (US)

(73) Assignee: New York University, New York, NY (US)

( * ) Notice: Subject to any disclaimer, the term of this patent is extended or adjusted under 35 U.S.C. 154(b) by 1067 days.

(21) Appl. No.: 16/798,846

(22) Filed: Feb. 24, 2020

(65) Prior Publication Data

US 2020/0269363 A1     Aug. 27, 2020

Related U.S. Application Data

(60) Provisional application No. 62/808,909, filed on Feb. 22, 2019.

(51) Int. Cl.
B23K 37/02 (2006.01)
B23K 9/00 (2006.01)
(Continued)

(52) U.S. Cl.
CPC ........ B23K 37/0282 (2013.01); B23K 9/0026 (2013.01); B23K 9/0282 (2013.01); B23K 37/0229 (2013.01); B23K 37/0241 (2013.01); B23K 37/0247 (2013.01); B23K 37/0294 (2013.01); B25J 5/005 (2013.01);
(Continued)

(58) Field of Classification Search
CPC .......................... B23K 37/0282; B23K 9/0026; B23K 9/0282;

B23K 37/0229; B23K 37/0241; B23K 37/0247; B23K 37/0294; B23K 2101/28; B23K 9/025; B25J 5/005; B25J 5/02; B25J 11/005; B25J 9/0009
See application file for complete search history.

(56) References Cited

U.S. PATENT DOCUMENTS 4,568,070 A * 2/1986 Severt ...................... B23Q 1/48
269/61
4,906,113 A * 3/1990 Sague ................. F16C 33/3706
384/618

(Continued)

FOREIGN PATENT DOCUMENTS

CN     102601496 A * 7/2012
CN     202639740 U * 1/2013 ........... B23K 31/027
(Continued)

OTHER PUBLICATIONS

North Carolina Department of Transportation Field Welding Procedures, Jun. 2011, 4th Edition, pp. G-1, G-4, 12-1, 12-2 (Year: 2011).*

*Primary Examiner* — Brian W Jennison
*Assistant Examiner* — Kristina J Babinski
(74) *Attorney, Agent, or Firm* — Riverside Law LLP

(57)     ABSTRACT
The present invention provides improved systems for supporting and translating a robotic welder around a structural column to perform automatic welding of joints. The improved system permits a robotic welder to perform the required welds in at least half the time it would take a human welder, thereby significantly reducing construction costs, improving safety of construction, and improving accuracy of welding, and requiring less testing of the welds.

19 Claims, 6 Drawing Sheets

(51) Int. Cl.

| | |
|---|---|
| *B23K 9/028* | (2006.01) |
| *B23K 101/28* | (2006.01) |
| *B25J 5/00* | (2006.01) |
| *B25J 5/02* | (2006.01) |
| *B25J 11/00* | (2006.01) |

(52) U.S. Cl.
CPC .............. *B25J 5/02* (2013.01); *B25J 11/005*
(2013.01); *B23K 2101/28* (2018.08)

(56) References Cited

U.S. PATENT DOCUMENTS

2010/0025964 A1*    2/2010    Fisk ....................... B62D 13/04
                                                                901/1
2012/0096702 A1*    4/2012    Kingsley ................ B23P 23/04
                                                                29/561

2013/0247359 A1*    9/2013    Schoening ......... B23K 37/0435
                                                                29/559
2014/0034714 A1*    2/2014    Gatlin .................... B23K 9/121
                                                                228/44.3
2015/0033640 A1*    2/2015    Cantoni .................... E04H 7/30
                                                                52/126.6
2016/0053809 A1*    2/2016    Selzer .................... F16C 17/10
                                                                384/297
2017/0252845 A1*    9/2017    Cash ................. B23K 37/0282

FOREIGN PATENT DOCUMENTS

| | | | | | |
|---|---|---|---|---|---|
| CN | 108817635 | A | * | 11/2018 | |
| CN | 109332968 | A | * | 2/2019 | ............ B23K 37/02 |
| JP | 04333369 | A | * | 11/1992 | |

* cited by examiner

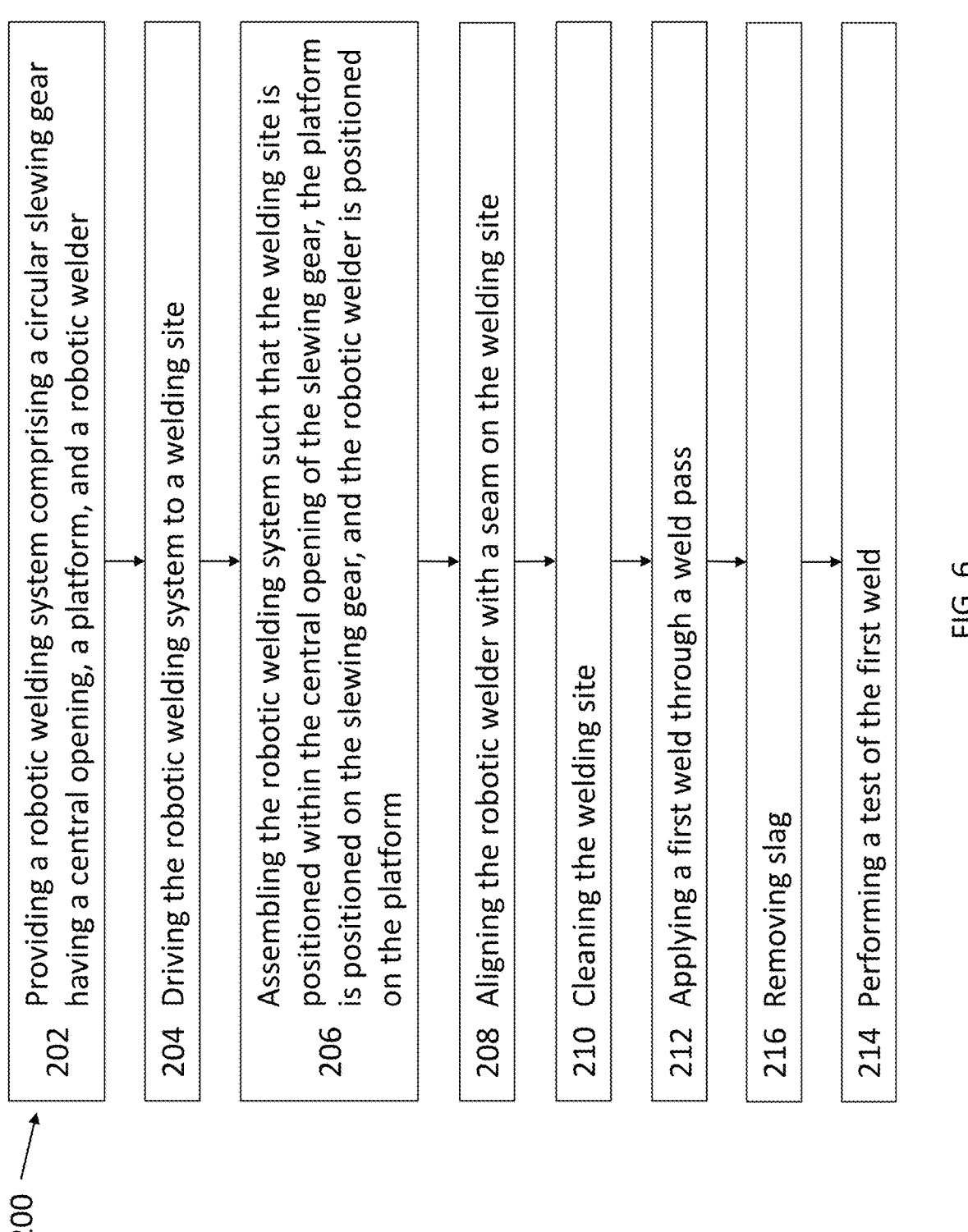

200

202  Providing a robotic welding system comprising a circular slewing gear having a central opening, a platform, and a robotic welder 204  Driving the robotic welding system to a welding site 206  Assembling the robotic welding system such that the welding site is positioned within the central opening of the slewing gear, the platform is positioned on the slewing gear, and the robotic welder is positioned on the platform 208  Aligning the robotic welder with a seam on the welding site 210  Cleaning the welding site 212  Applying a first weld through a weld pass 216  Removing slag 214  Performing a test of the first weld

FIG. 6

ROBOTICS FOR WELDING OF COLUMNS

CROSS-REFERENCE TO RELATED APPLICATIONS

This application claims priority to U.S. Provisional Patent Application No. 62/808,909, filed Feb. 22, 2019, the contents of which are incorporated by reference herein in its entirety.

BACKGROUND OF THE INVENTION

When a structural steel frame for a building is erected, the first element that is installed are the vertical steel columns. These are usually two stories high (approximately 30 feet in height) and extend above the floor steel beams by approximately four feet (welding height). The total height of the column will remain at approximately 30 feet. When the steel frame is extended vertically, a new section of a vertical steel column must be attached to the first section. The column sections are temporarily joined together using vertical steel angles that keep the columns aligned. The final attachment is achieved by welding the two sections together at the joint, which requires a groove weld.

The current process for welding structural columns is done by human welders using a welding machine and welding rods or welding ribbon on a spool, and is time consuming and expensive. For example, a column that is approximately 14 inches by 14 inches in plan, a 5 inch thick groove weld requires 30-40 welding passes and a 2 inch thick joint penetration weld for a column connection requires approximately 50-75 passes, wherein one pass consists of a complete welding around the perimeter of the column joint.

It takes approximately 12 hours for one human welder to weld one column connection including set-up, grinding down the weld, re-spooling, and welding. Additional time is needed for testing the weld during and after the welding process. Welders typically earn about $150/hour; therefore, each weld could cost approximately $2,250 including time for set-up, welding, testing, and breaks. Human welders also require special training and equipment and require breaks and may suffer from fatigue.

Thus, there is a need in the art for improved systems for welding at a site of construction. The present invention meets this need.

SUMMARY OF THE INVENTION

In one aspect, the present invention relates to a portable robotic welding system, comprising: a slewing gear comprising a circular inner gear defining a central opening, the inner gear nested within a circular outer gear, wherein the inner gear and outer gear are independently rotatable; a platform removably positioned on the slewing gear; a robotic welder removably positioned on the platform; and a driving gear removably positioned on the slewing gear.

In one embodiment, the slewing gear comprises a plurality of bearings positioned between the inner gear and the outer gear. In one embodiment, the bearings are selected from the group consisting of: ball bearings, cylindrical bearings, ring bearings, and roller bearings. In one embodiment, the inner gear and the outer gear each comprise a plurality of mounting holes positioned along a central arc of each gear.

In one embodiment, the system further comprises a plurality of leveling feet removably attached to each of the mounting holes underneath the inner gear. In one embodiment, the plurality of leveling feet are each selected from the group consisting of: threaded leveling mounts, swivel leveling mounts, jack stands, and hydraulic stands.

In one embodiment, the platform is removably attached to a top side of the outer gear. In one embodiment, the platform further comprises a raised shield positioned on an outer edge. In one embodiment, the platform further comprises on or more counterweights.

In one embodiment, the driving motor is secured to the inner gear and mated to the outer gear, such that the driving gear drives the outer gear. In one embodiment, the slewing gear is separable into at least two segments. In one embodiment, each slewing gear segment comprises opposing ends each having a slot formed between an inner gear segment and an outer gear segment, the slot being sized to receive an end plate such that the end plate spans a space between the inner gear segment and the outer gear segment. In one embodiment, the end plate positioned at each opposing end of the slewing gear segment retains a plurality of bearings between the inner gear segment and the outer gear segment. In one embodiment, the at least two segments are joinable by an attachment means selected from an angle, bolt, and nut system and a clamp.

In one embodiment, the system further comprises a cart sized to hold the slewing gear, the platform, a plurality of leveling feet, and a platform shield. In one embodiment, the cart is towable by the robotic welder or independently drivable.

In another aspect, the present invention provides a method of robotic welding, comprising the steps of: providing the system of the present invention; driving the system to a welding site; assembling the robotic welding system such that the welding site is positioned within the central opening of the slewing gear, the platform is positioned on the slewing gear, and the robotic welder is positioned on the platform; aligning the robotic welder with a seam on the welding site; cleaning the welding site; applying a first weld through a weld pass; removing slag; and performing a test of the first weld.

In one embodiment, the welding site is a vertical structural column. In one embodiment, the platform is rotated around the welding site for each weld pass. In one embodiment, the method further comprises one or more welding stages, each welding stage comprising the steps of: cleaning the welding site; applying a weld through a weld pass; removing slag; and performing a test of the weld.

BRIEF DESCRIPTION OF THE DRAWINGS

The following detailed description of exemplary embodiments of the invention will be better understood when read in conjunction with the appended drawings. It should be understood, however, that the invention is not limited to the precise arrangements and instrumentalities of the embodiments shown in the drawings.

FIG. 6 depicts a flowchart for an exemplary method of robotic welding.

DETAILED DESCRIPTION

Figure 1:
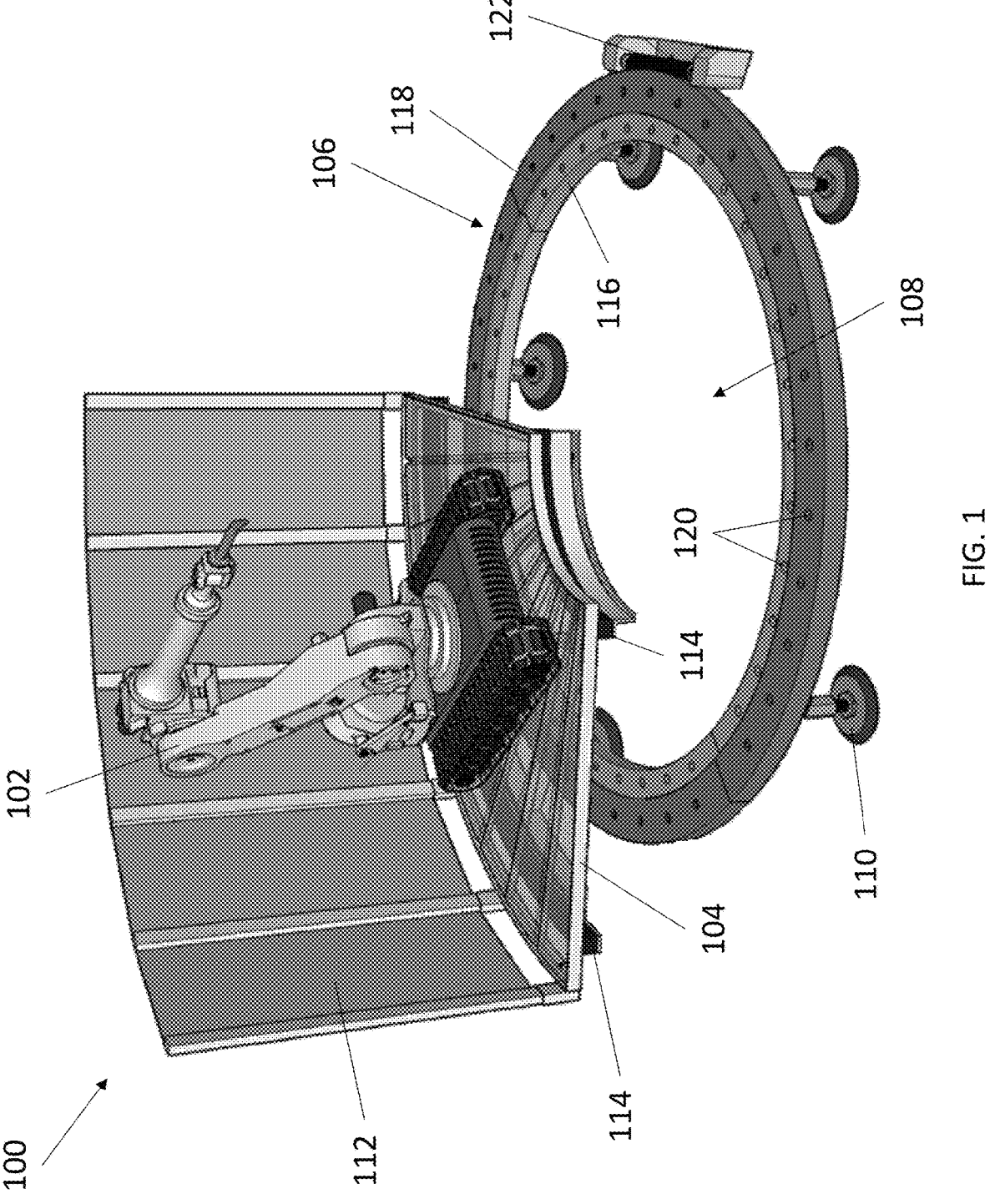
FIG. 1 depicts a perspective view of an exemplary robotic welding system.

The present invention provides improved systems for supporting and translating a robotic welder around a structural column to perform automatic welding of joints. The improved system permits a robotic welder to perform the required welds in at least half the time it would take a human welder, thereby significantly reducing construction costs, improving safety of construction, and improving accuracy of welding, and requiring less testing of the welds.

Definitions

It is to be understood that the figures and descriptions of the present invention have been simplified to illustrate elements that are relevant for a clear understanding of the present invention, while eliminating, for the purpose of clarity, many other elements typically found in the art. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range.

Robotic Welding System

It has been found that using robotics to perform welds can increase accuracy, reduce the amount of time necessary to complete a weld, provide less down time because human welders require breaks, and reduce fatigue in welders (Moon S B et al., Industrial Robot: An International Journal. 2003 Jun. 1; Saeed, Khurram, and Theresa Juva-Brown. "Robotic Welding on Tappan Zee Bridge." Lohud.com, 4 Jun. 2014). However, there are no viable solutions in the marketplace for using robotics to weld columns at construction sites. Accordingly, the present invention provides portable robotic welding systems that can be deployed to a welding site to perform automatic welding of joints.

Figure 2:
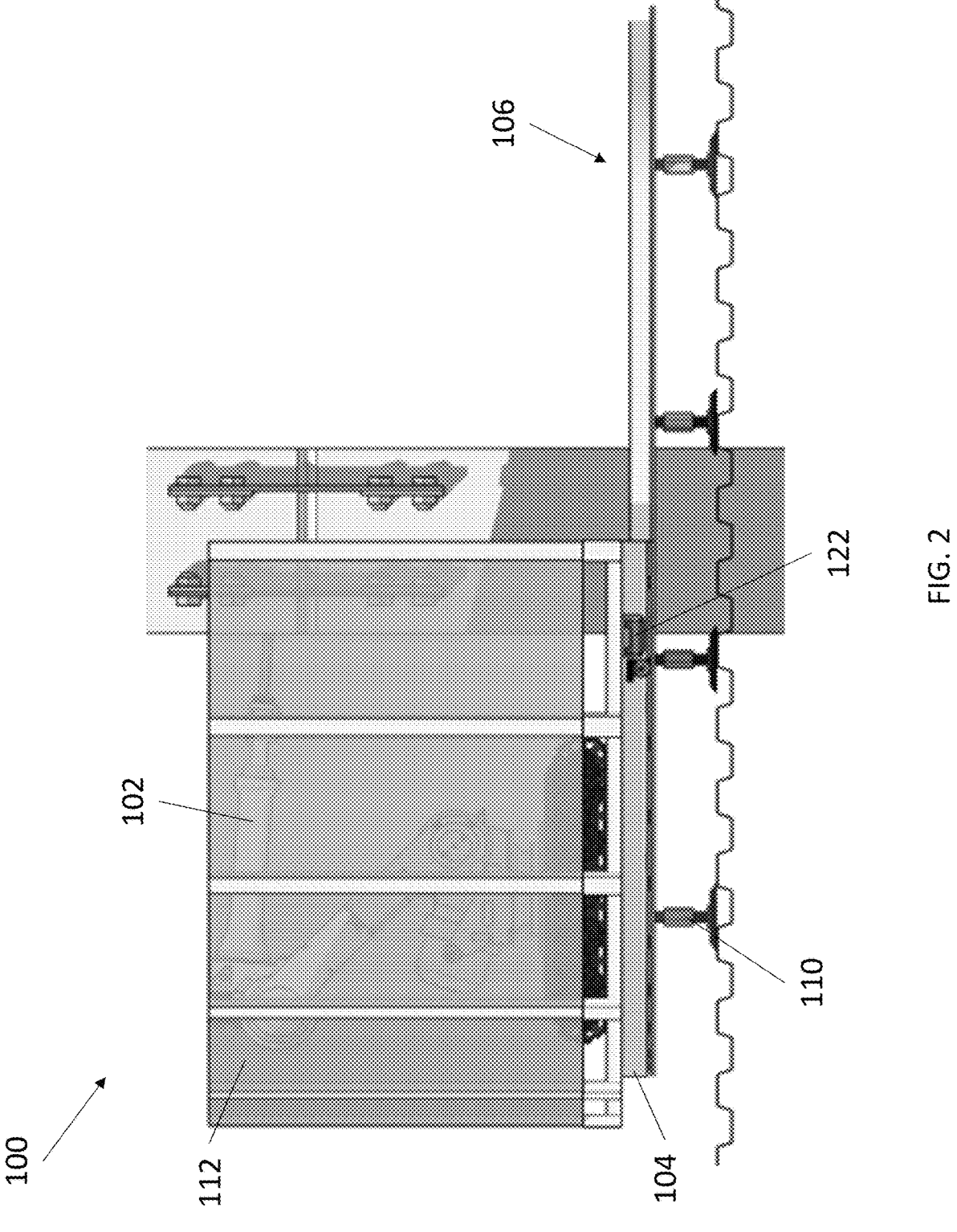
FIG. 2 depicts a side view of an exemplary robotic welding system in a deployed configuration around a vertical structural column.

Referring now to FIG. 1 and FIG. 2, an exemplary robotic welding system 100 is depicted. System 100 comprises a robotic welder 102, a platform 104, and a slewing gear 106. Slewing gear 106 defines a central opening 108 where a structure to be welded can be positioned. Platform 104 is secured to slewing gear 106 and robotic welder 102 sits atop platform 104, wherein platform 104 and robotic welder 102 are moveable in a circular direction to orbit central opening 108. Robotic welder 102 can be secured to platform 104 using any suitable connector, including but not limited to, L-shaped brackets, bolts, ratchet straps, or other types of connectors.

Platform 104 can comprise any suitable size. In some embodiments, the size of platform 104 can be described in terms of the proportions of a circular shape of slewing gear 106, such as a quarter arc or half arc of the circular shape of slewing gear 106. In various embodiments, platform 104 is modular and can be increased or decreased in size by the addition or removal of one or more panels. In some embodiments, platform 104 further comprises shielding 112 positioned on an outer edge, such that system operators and bystanders are protected from sparks, debris, and robotic welder 102 motion. In some embodiments, the stability of system 100 is enhanced by the addition of one or more counterweights 114 to balance the weight of robotic welder 102 and platform 104. Counterweights 114 can be positioned on platform 104 near inner gear 116 and/or outer gear 118. Counterweights 114 can also be movably positioned on slewing gear 106 opposite to a current position of platform 104, such that as platform 104 is relocated around slewing gear 106, counterweights 114 are continually repositioned to maintain its orientation opposite to platform 104.

As would be understood by those having skill in the art, slewing gear 106 represents a typical slewing gear comprising a circular inner gear 116 nested within a circular outer gear 118 and a plurality of bearings 124 (depicted diagrammatically in FIG. 4) positioned between inner gear 116 and outer gear 118. Slewing gears generally comprise a plurality of ball bearings or roller bearings with optional spacers positioned between an inner gear and outer gear. However, it should be understood that slewing gear 106 can include any suitable bearing, including but not limited to ball bearings, cylindrical bearings, ring bearings, roller bearings, and the like. Inner gear 116 and outer gear 118 thereby spin independent from one another guided by bearings 124. Inner gear 116 and outer gear 118 each comprise a plurality of holes 120 positioned along a central arc of each gear. Holes 120 are configured for the removable attachment of platform 104 (such as by equally sized bolts or pins underneath platform 104) and for the removable attachment of a plurality of leveling feet 110. Leveling feet 110 raise system 100 from the ground or floor surface and are individually height-adjustable to compensate for angled or uneven ground or floor surfaces, or to orient system 100 at an angle to match angled welding structures or environments. Contemplated leveling feet 110 are adjustable using typical tools such as wrenches and drills having compatible driver bits and can include but are not limited to threaded leveling mounts, swivel leveling mounts, jack stands, hydraulic jacks, and the like. In various embodiments, system 100 can further comprise one or more level mechanisms to guide the adjustment of leveling feet 110, including but not limited to spirit or bubble levels and laser levels.

The size of system 100 can have any suitable size and can be described in terms of the size of slewing gear 106 or the combined size of slewing gear 106 with platform 104 positioned on top. For example, in one embodiment, system 100 has an outer diameter between about 5 feet to about 50 feet. In one embodiment, central opening 108 has a diameter between about 2 feet to about 15 feet. In various embodiments, it should be understood that system 100 is sufficiently sized to fit a vertical support column within central opening 108, wherein typical vertical support columns have a width of about 24 inches.

The driving of slewing gear 106 is now described. It should be noted that the following description refers to one embodiment of system 100 and should not be construed to limit the arrangement and motion of components. Slewing gear 106 further comprises a motorized driving gear 122. Typical slewing gears are paired with a worm gear, but it should be understood that driving gear 122 can be any suitable gear, including but not limited to a worm gear, spur gear, helical gear, bevel gear, crown gear, cage gear, and the like. Driving gear 122 is secured to inner gear 116 and is mated to outer gear 118, such that driving gear 122 spins outer gear 118. In this manner operation of system 100 holds inner gear 116 stationary and revolves outer gear 118. Leveling feet 110 can be secured to inner gear 116 to complete the stationary portion of system 100, while platform 104 can be secured to outer gear 118 and orbit central opening 108 with the motion of outer gear 118.

In some embodiments, outer gear 118 can be held stationary and inner gear 116 can be driven. For example, leveling feet 110 can be secured to outer gear 118 and driving gear 122 can be secured to outer gear 118 and mated to inner gear 116, such that driving gear 112 spins inner gear 116. Accordingly, leveling feet 110 can be secured to outer gear 118 and platform 104 can be secured to inner gear 116 and orbit central opening 108 with the motion of inner gear 116.

Figure 3:
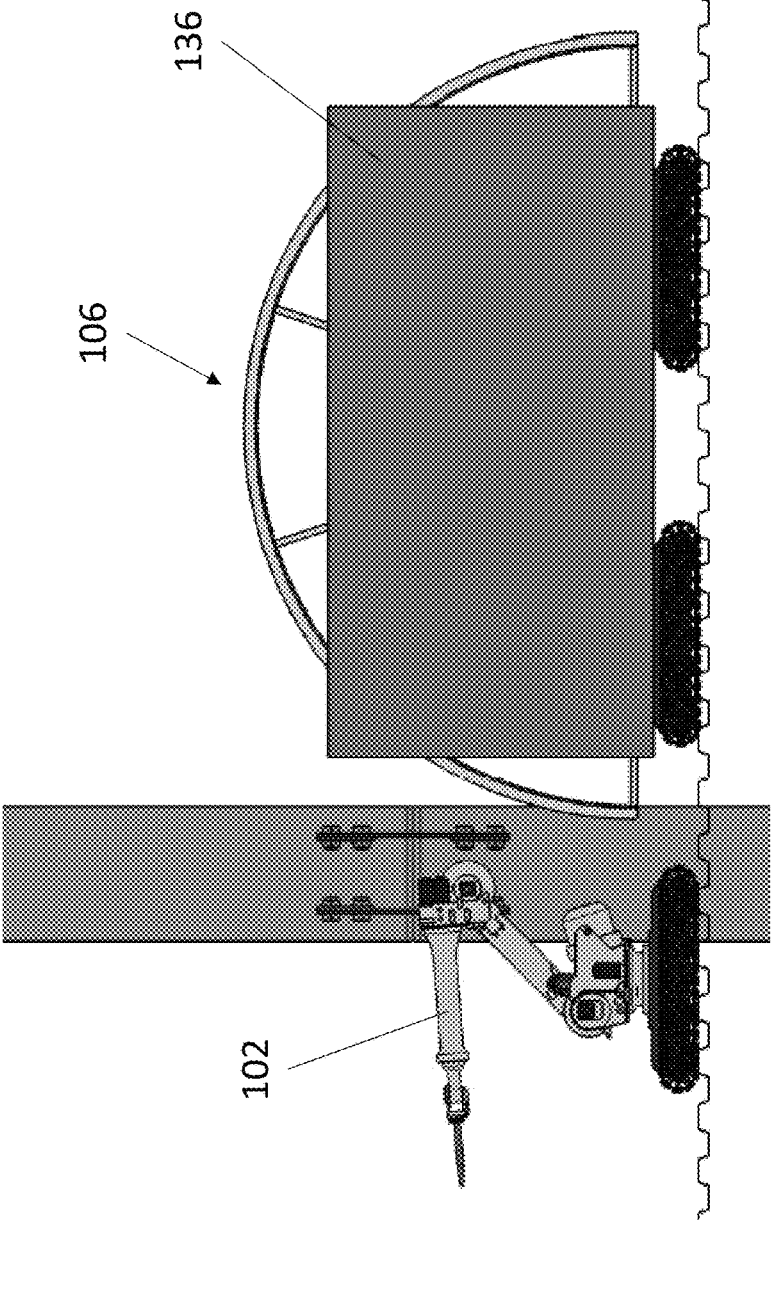
FIG. 3 depicts a side view of an exemplary robotic welding system in a mobile configuration.

In some embodiments, slewing gear 106 is separable into at least two segments for portability and to enable system 100 to be assembled around a structure for welding. Referring now to FIG. 3, the portability of system 100 is showcased with a mobile robotic welder 102 alongside a cart 136, wherein the segments of slewing gear 106 and the various additional components of system 100 are stowed aboard cart 136. The additional components include but are not limited to the aforementioned platform 104, leveling feet 110, shielding 112, counterweights 114, as well as any assortment of welding tools, supplies, equipment, and the like necessary for a welding job. In some embodiments, cart 136 comprises a tow hook connectable to robotic welder 102 and is towable to and from construction sites. In some embodiments, cart 136 comprises a powered drive, such as an electric, gas, or diesel powered motor, and is drivable on its own. Robotic welder 102 and cart 136 are depicted as having treads for tracked propulsion, as typical construction sites are supported by metal decking and the surrounding environment may be uneven and/or muddy. However, it should be understood that any suitable propulsion mechanism is contemplated, including wheels, half-tracks, sleds, and rail wheels.

Figure 4:
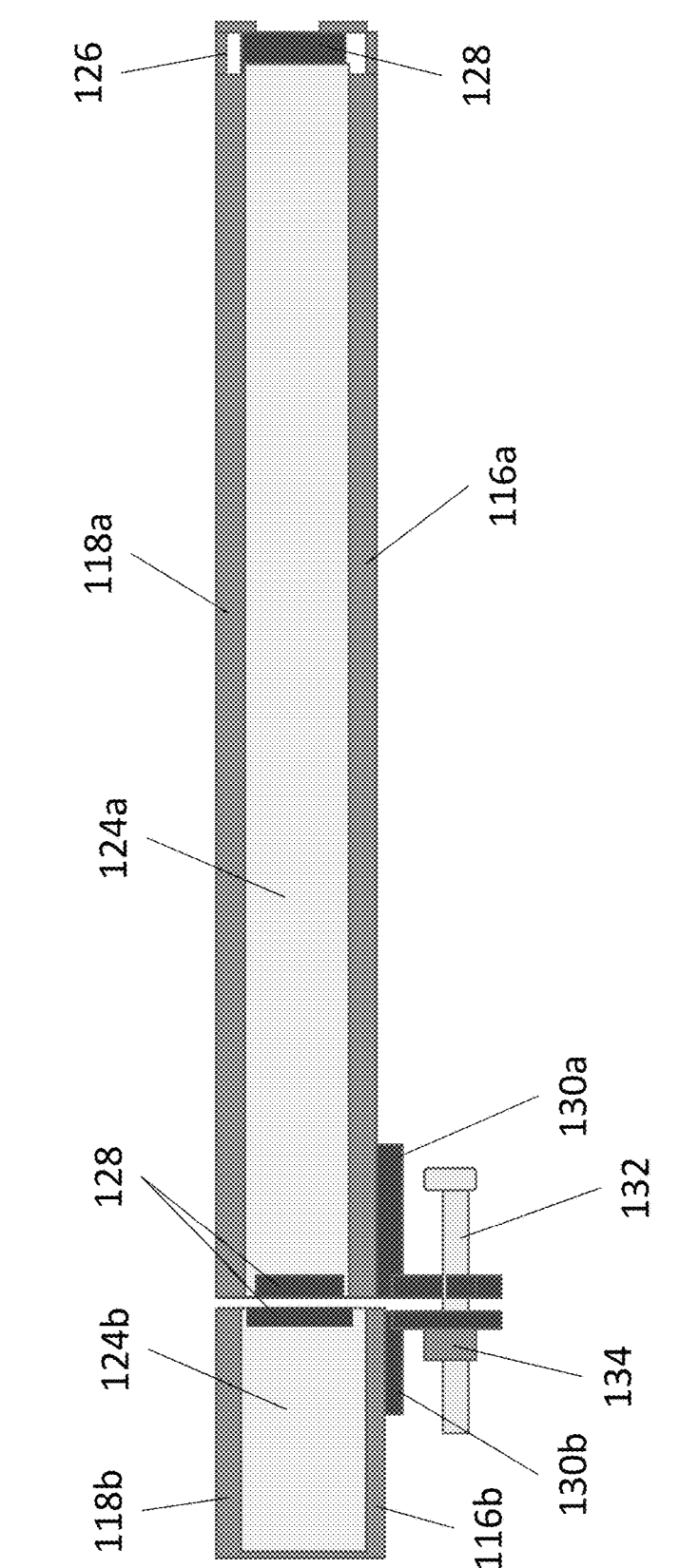
FIG. 4 depicts a plan view schematic of a slewing gear of an exemplary robotic welding system.

As slewing gear 106 comprises a substantially circular shape, each segment of slewing gear 106 accordingly has an arc shape forming a portion of the circular shape of slewing gear 106. Referring now to FIG. 4, a plan view schematic of slewing gear 106 is depicted illustrating additional mechanisms for separating and joining each of the segments of slewing gear 106. As described elsewhere herein, slewing gear 106 comprises an inner gear 116, an outer gear 118, and a plurality of bearings 124. Disassembly of slewing gear 106 necessitates some means for securing the plurality of loose bearings 124. Accordingly, the additional mechanisms are provided to temporarily secure the plurality of bearings 124 within a segment of slewing gear 106 between inner gear 116 and outer gear 118.

Each slewing gear 106 segment comprises an inner gear segment 116a, an outer gear segment 118b, and bearing section 124a. Each slewing gear 106 segment is capped by an open end having a slot 126 sized to fit an end plate 128. Affixing an end plate 128 into each slot 126 blocks each open end and secures the section of bearings 124a within each slewing gear 106 segment for transport or storage. In various embodiments, end plate 128 can be securely affixed within each slot 126 by a clamp or screw.

Each slewing gear 106 segment further comprises an attachment mechanism positioned adjacent to each open end, wherein the attachment mechanism fastens each slewing gear 106 segment to each other for reassembly of a full slewing gear 106. The attachment mechanism can comprise any mechanism configured to securely and reversibly connect the slewing gear 106 segments together. In some embodiments, the attachment mechanism comprises at least one angle 130a positioned adjacent to each open end, wherein each angle 130a comprises a slot or hole sized to fit a securing mechanism, such as bolt 132 and nut 134 or a clamp. As depicted in FIG. 4, inner gear 116a, outer gear 118a, and bearing section 124a of a first slewing gear 106 segment is aligned with inner gear 116b, outer gear 118b, and bearing section 124b of a second slewing gear 106 segment, which also aligns angle 130a and angle 130b in close proximity. Bolt 132 is passed through the slots or holes of angle 130a and angle 130b, whereupon nut 134 can be threaded onto bolt 132 and tightened to securely attach first slewing gear 106 segment to second slewing gear 106 segment. The various components can thereby be assembled and disassembled without the use of specialized equipment, achievable within 30 to 45 minutes using as little as a simple ratchet wrench.

Figure 5:
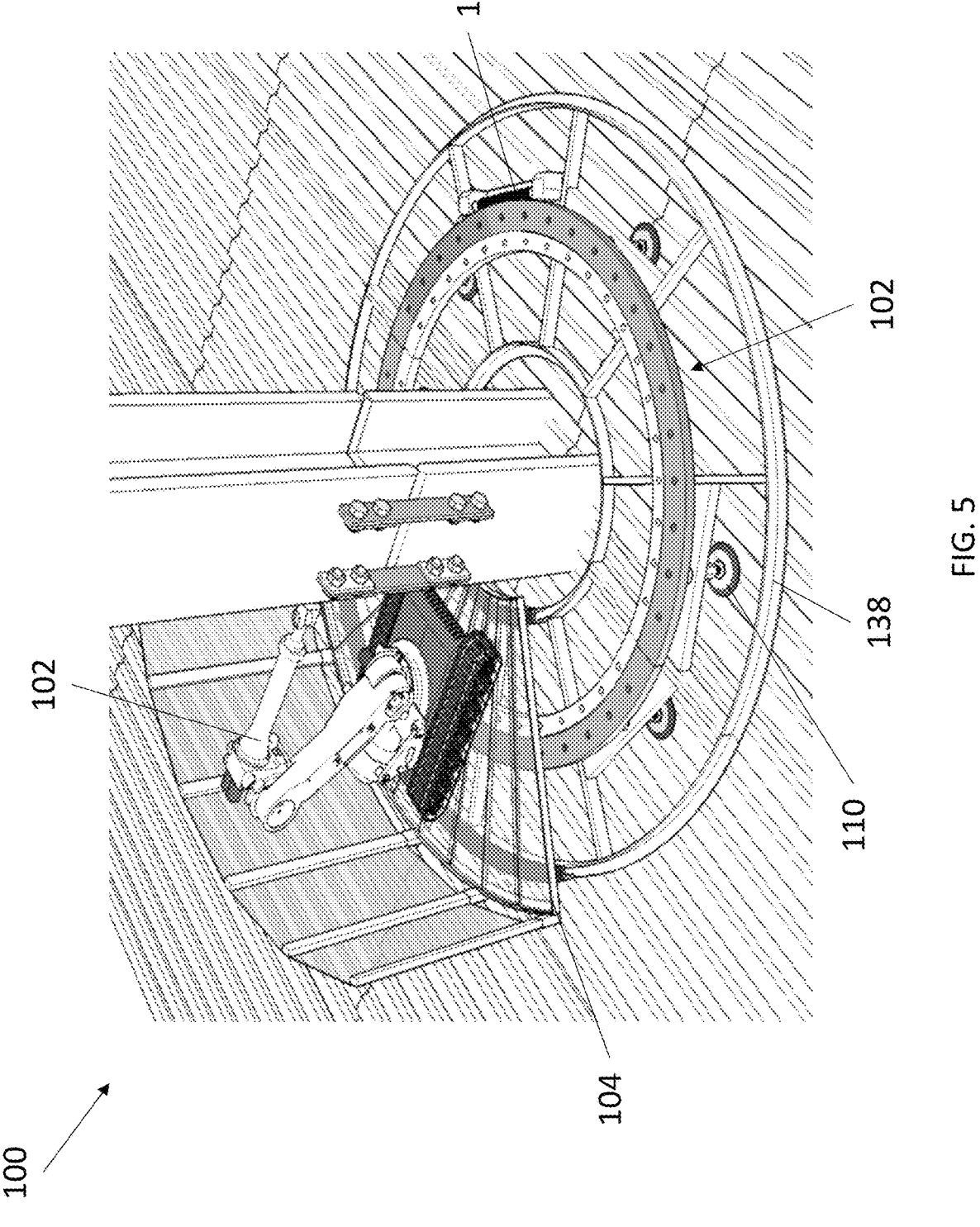
FIG. 5 depicts a perspective view of another exemplary robotic welding system.

It should be understood that the several features of the fastener anchoring devices of the present invention can be rearranged or modified without altering their function to accommodate different orientations and configurations. For example, as shown in FIG. 5, system 100 can be supplemented with a frame 138 to enhance rigidity and stability. While system 100 can operate without frame 138, certain environments may benefit from the inclusion of frame 138. For example, in scenarios where leveling feet 110 cannot be positioned in an ideal location, frame 138 can provide additional mounting points to stably place leveling feet 110. In some embodiments, slewing gear 106 can comprise planetary gears having an inner ring gear defining a central opening and an outer ring gear, wherein the inner ring gear and outer ring gear are driven by a plurality of planet gears positioned in-between. In some embodiments, slewing gear 106 can comprise a single circular rail track that is separable into segments for portability and reassembly around a welding site. Driving gear 122 can be attached to platform 104, such that driving gear 122 directly drives platform 104 along the circular rail track. In any variation of slewing gear 106, it should be understood that slewing gear 106 remains separable into segments for portability and reassembly around a welding site.

The components of the robotic welding system of the present invention can be made using any suitable method known in the art. The method of making may vary depending on the materials used. For example, components of the device comprising a metal may be milled from a larger block of metal or may be cast from molten metal. Suitable metals include lightweight, sturdy, and fireproof materials such as aluminum. Alternative materials are also contemplated, including magnesium, titanium, and the like. Likewise, components of the device substantially comprising a plastic or polymer may be milled from a larger block or injection molded. In some embodiments, the devices may be made using 3D printing or other additive manufacturing techniques commonly used in the art. In various embodiments, system 100 is constructed in a manner that emphasizes lightweight material without compromising structural rigidity. For example, slewing gear 106 can include a combination of metal, plastic, or polymer materials for inner gear 116, outer gear 118 and bearings 124.

In some embodiments, system 100 further comprises a computer system comprising non-transitory computer-readable media with software executing certain instructions stored on the non-transitory computer-readable media. The computer system may further comprise a processor that executes the software to perform some or all of the steps of the stored instructions. The stored instructions can include steps for manipulating movement of the portable components of system 100. For example, the stored instructions can include steps for advancing robotic welder 102 and/or cart 136 in a forward direction, a reverse direction, or to turn left or right, as well as speed, acceleration, and braking. The stored instructions can also include steps for manipulating driving gear 122, such as speed, acceleration, and clockwise and counterclockwise directions.

The stored instructions can also include steps for manipulating welding parameters of the robotic welder 102, including but not limited to wire speed, arc voltage, arc location, gas flow rate, pulsing parameters, travel speed, arc location, gun angle, seam finding, seam tracking, electrode stick out, adaptive fill contour, using self-shielded flux core wire, using different shielding gases (such as carbon dioxide), and the like. The stored instructions can also include steps for analyzing weld parameters, including but not limited to soundness, size, shape, penetration, and other properties. In some embodiments, the steps can include the synchronization of certain weld parameters of the robotic welder 102 with the driving of driving gear 122. For example, the speed of driving gear 122 can be synchronized with the welding speed of robotic welder 102.

The stored instructions can also include steps for performing a weld. For example, as shown in FIG. 6, an exemplary method can begin with a step 202 of providing a robotic welding system of the present invention comprising a circular slewing gear having a central opening, a platform, and a robotic welder. In step 204, the robotic welding system is driven to a welding site. In step 206, the robotic welding system is assembled such that the welding site is positioned within the central opening of the slewing gear, the platform is positioned on the slewing gear, and the robotic welder is positioned on the platform. The stored instructions can then continue with step 208 of aligning the robotic welder with a seam; step 210 of cleaning the weld area; step 212 of applying a first weld through a weld pass; step 214 of removing slag; and step 216 of performing a test of the first weld. In certain embodiments, the steps can include one or more additional stages of: cleaning the weld area, applying an additional weld through a weld pass, removing slag, and testing the additional weld.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C #, Objective-C, Java, JavaScript, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, and 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A portable robotic welding system, comprising:
   a slewing gear comprising a circular inner gear defining a central opening, the inner gear nested within a circular outer gear, wherein the inner gear and outer gear are independently rotatable about an axis, and the inner gear comprises a plurality of mounting holes positioned along a central arc of the gear, and wherein the outer gear and the inner gear are each separable into at least two releasably attached segments at a set of attachment points, the slewing gear configured to be assembled around a structure;

a platform removably positioned on the slewing gear;

a robotic welder removably positioned on the platform; a driving gear removably positioned on the slewing gear;

a channel extending around the axis, bounded by the inner gear and the outer gear;

a plurality of bearings positioned within the channel between the inner gear and the outer gear; and a slot positioned in each segment of the inner and outer gears, intersecting the channel at each attachment point, configured to accept an end plate which interrupts the movement of bearings within the channel when inserted.

2. The system of claim 1, wherein the plurality of bearings comprises roller bearings.

3. The system of claim 1, wherein the platform is removably attached to a top side of the outer gear.

4. The system of claim 1, wherein the platform further comprises a raised shield positioned on an outer edge.

5. The system of claim 1, wherein the platform further comprises one or more counterweights.

6. The system of claim 1, wherein the driving gear is secured to the inner gear and mated to the outer gear, such that the driving gear drives the outer gear.

7. The system of claim 1, wherein the at least two segments are joinable by an attachment means selected from an angle, bolt, and nut system and a clamp.

8. The system of claim 1, further comprising a cart sized to hold the slewing gear, the platform, a plurality of leveling feet, and a platform shield.

9. The system of claim 8, wherein the cart is towable by the robotic welder or independently drivable.

10. A method of robotic welding, comprising the steps of:

providing the system of claim 1;

driving the system to a welding site;

assembling the robotic welding system such that the welding site is positioned within the central opening of the slewing gear, the platform is positioned on the slewing gear, and the robotic welder is positioned on the platform;

aligning the robotic welder with a seam on the welding site;

cleaning the welding site;

applying a first weld through a weld pass;

removing slag; and performing a test of the first weld.

11. The method of claim 10, wherein the welding site is a vertical structural column.

12. The method of claim 10, wherein the platform is rotated around the welding site for each weld pass.

13. The system of claim 1, further comprising a counterweight positioned diametrically opposite the platform on the slewing gear, configured to reposition itself relative to the platform.

14. The system of claim 1, further comprising a plurality of leveling feet extending downward from the inner gear in a direction parallel to the rotational axis of each gear, and removably attached to each of the mounting holes of the inner gear.

15. The system of claim 14, wherein the plurality of leveling feet are each selected from the group consisting of: threaded leveling mounts, swivel leveling mounts, jack stands, and hydraulic stands.

16. The system of claim 1, further comprising a circular frame removably attached to the plurality of mounting holes of the inner gear.

17. The system of claim 16, wherein the circular frame comprises a plurality of leveling feet extending downward from the circular frame.

18. The system of claim 5, wherein the one or more counterweights comprise a first counterweight positioned inside the central opening of the slewing gear, and a second counterweight positioned outside of the central opening of the slewing gear.

19. The system of claim 5, wherein the one or more counterweights are attached to a bottom side of the platform.

* * * * *